(12) United States Patent
Hochi

(10) Patent No.: US 7,552,752 B2
(45) Date of Patent: Jun. 30, 2009

(54) RUBBER COMPOSITION FOR BASE TREAD

(75) Inventor: Kazuo Hochi, Kobe (JP)

(73) Assignee: Sumitomo Rubber Industries, Ltd., Kobe-Shi, Hyogo-Ken (JP)

(*) Notice: Subject to any disclaimer, the term of this patent is extended or adjusted under 35 U.S.C. 154(b) by 0 days.

(21) Appl. No.: 11/846,395

(22) Filed: Aug. 28, 2007

(65) Prior Publication Data

US 2007/0299230 A1    Dec. 27, 2007

Related U.S. Application Data

(62) Division of application No. 11/315,246, filed on Dec. 23, 2005, now abandoned.

(30) Foreign Application Priority Data

Jan. 19, 2005   (JP)   .............................. 2005-011619

(51) Int. Cl.
*B60C 1/00*   (2006.01)
*C08L 9/00*   (2006.01)
*C08F 236/14*   (2006.01)

(52) U.S. Cl. .................... 152/209.5; 152/905; 525/237; 526/338

(58) Field of Classification Search ............... 152/209.5, 152/905; 526/339, 338; 525/237
See application file for complete search history.

(56) References Cited

U.S. PATENT DOCUMENTS

| 5,081,191 A | | 1/1992 | Quirk |
| 5,843,249 A | * | 12/1998 | Ryba et al. ............... 152/209.1 |
| 6,133,388 A | | 10/2000 | Lee et al. |
| 2003/0079816 A1 | * | 5/2003 | Mizuno ............... 152/209.5 |
| 2003/0216522 A1 | | 11/2003 | Oshima et al. |
| 2004/0261926 A1 | * | 12/2004 | Ozel et al. ............... 152/209.5 |

FOREIGN PATENT DOCUMENTS

| DE | 10315274 A1 | 11/2003 |
| EP | 0647675 A1 | 4/1995 |
| EP | 1334985 A1 | 8/2003 |
| JP | 7-109384 A | 4/1995 |
| JP | 2003-160603 A | 6/2003 |
| JP | 2003-201314 A | 7/2003 |
| JP | 2003-231713 A | 8/2003 |
| JP | 2003-292529 A | 10/2003 |

OTHER PUBLICATIONS

English translation of JP-2003-160603-A, Published Jun. 3, 2003.
Database WPI, Section Ch, Week 200410, Derwent Publications Ltd, London, GB; An 2004-093482, XP002374926.

* cited by examiner

*Primary Examiner*—Fred M Teskin
(74) *Attorney, Agent, or Firm*—Birch, Stewart, Kolasch & Birch, LLP

(57) ABSTRACT

The object of the present invention is to provide a rubber composition for base tread enhancing a low fuel consumption property of a vehicle. A rubber composition for base tread comprises a rubber composition containing 15 to 80% by weight of a butadiene rubber obtained by copolymerizing a compound represented by the formula 1,

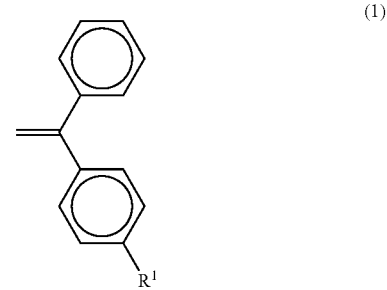

(1)

wherein $R^1$ represents an amino group, an alkoxy group, a silyloxy group, an acetal group, a carboxyl group, a mercapto group or a derivative thereof.

12 Claims, No Drawings

RUBBER COMPOSITION FOR BASE TREAD

CROSS-REFERENCE TO RELATED APPLICATION

The present application is a Divisional of U.S. Application No. 11/315,246, filed on Dec. 23, 2005, now abandoned, which claims priority of Application No. 2005-11619 filed in Japan on Jan. 19, 2005 under 35 U.S.C. 119, the entire contents of which are hereby incorporated by reference.

BACKGROUND OF THE INVENTION

The present invention relates to a rubber composition for base tread.

In recent years, the fuel consumption of a vehicle has been conducted by reducing rolling resistance of a tire to suppress heating. Particularly, the reduction of the fuel consumption of the vehicle has been strongly required, and excellent low heat build-up properties have been required for a tread having a high occupancy ratio in the tire among tire members.

An excellent grip performance has been also required for the tread of the tire in view of safety in vehicle driving. However, since the low fuel consumption property and the grip performance are rebellion performances, the tread has been generally composed of a two-layer structure of a cap tread/a base tread, and a rubber having low heat build-up properties has been generally employed as the base tread. That is, the low fuel consumption property and the grip performance of the tire are compatible by using a rubber composition having high gripping force for a surface part coming into contact with a road surface such as the cap tread, and by using a rubber composition having low heat build-up properties for an inner layer part such as the base tread.

As mentioned above, although the rubber composition having low heat build-up properties is required for the base tread, the present condition is that the rubber composition for base tread having sufficient low heat build-up properties has not been yet obtained.

Although Japanese Unexamined Patent Publication No. 2003-292529 describes a polymer having a specific structure, it does not assume use for the base tread of the tire.

Although Japanese Unexamined Patent Publication No. 109384/1995 describes a rubber composition for base tread containing a star-type solution polymerization rubber, the rubber composition for base tread did not show sufficient low heat build-up properties.

SUMMARY OF THE INVENTION

It is an object of the present invention to provide a rubber composition for base tread enhancing low fuel consumption property of the vehicle.

The present invention relates to a rubber composition for base tread comprising a rubber component containing 15 to 80% by weight of a butadiene rubber obtained by copolymerizing a compound represented by the formula 1,

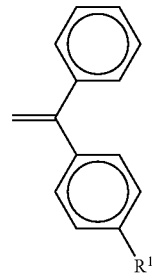

(1)

wherein $R^1$ represents an amino group, an alkoxy group, a silyloxy group, an acetal group, a carboxyl group, a mercapto group or a derivative thereof.

According to the present invention, the rubber composition for base tread sufficiently enhancing the low fuel consumption property of the vehicle can be provided by compounding the specific butadiene rubber.

DETAILED DESCRIPTION

The rubber composition for base tread of the present invention comprises a rubber component containing a butadiene rubber (hereinafter referred to as BR containing compound 1) obtained by copolymerizing the compound represented by the formula (1) (hereinafter referred to as compound 1). Herein, BR containing the compound 1 is the one obtained by copolymerizing the compound 1 and 1,3-butadiene rubber. The other examples of the rubber component containing the compound 1 are SBR obtained by copolymerizing three kinds of monomers of the compound 1, 1,3-butadiene and styrene, and the like, but in the present invention BR containing the compound 1 is used since large heat is generated in SBR due to styrene in SBR.

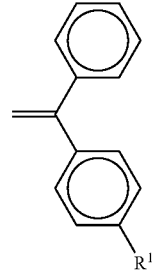

(1)

(wherein $R^1$ represents an amino group, an alkoxy group, a silyloxy group, an acetal group, a carboxyl group, a mercapto group or a derivative thereof.)

$R^1$ is preferably the amino group since interaction between the amino group and a reinforcing filler is large.

The amino group is preferably selected from the group consisting of N,N-dimethylamino group, N,N-diethylamino group, N,N-dipropylamino group, N,N-dibuylamino group and a morpholino group. Among these, N,N-dimethylamino group is particularly preferable since the interaction between N,N-dimethylamino group and the reinforcing filler is large.

The compounds 1 are preferably copolymerized in an amount of 1.1 to 5 units average per one molecule of BR containing the compound 1. When less than 1.1 units of compound 1 is copolymerized in one molecule of BR containing compound 1, the low fuel consumption property of the vehicle tends to be insufficient. When at least 5 units of compound 1 are copolymerized, processability of the rubber composition tends to be reduced.

The content of BR containing the compound 1 in the rubber component is at least 10% by weight, preferably at least 15% by weight, and more preferably at least 20% by weight. The content of less than 10% by weight causes increase in rolling resistance, and thereby the low heat build-up properties become insufficient. Also, the content of BR containing the compound 1 is at most 80% by weight, preferably at most 70% by weight, and more preferably at most 60% by weight. The content more than 80% by weight causes deteriorated processability in kneading.

As the rubber component, diene rubbers such as a natural rubber (NR), a polyisoprene synthetic rubber (IR), a general polybutadiene rubber (BR) containing no compound 1, a styrene-butadiene rubber (SBR), an acrylonitrile butadiene rubber (NBR), a chloroprene rubber (CR), a butyl rubber (IIR), and a styrene-isoprene-butadiene copolymerization rubber (SIBR) can be used together with BR containing the compound 1. These diene rubbers may be used alone or in a combination of two kinds or more. Particularly, it is preferable to use together the natural rubber (NR) and/or the isoprene rubber (IR) with BR containing the compound 1 in view of rubber strength.

Other than the above rubber components, the rubber composition for base tread of the present invention can contain a reinforcing filler such as carbon black, silica and clay, an antioxidant, a softener, sulfur, a silane coupling agent, a processing aid or the like, if necessary, which are usually used in the manufacture of the rubber composition for base tread in a usual amount. Among these, silica is preferably contained as the reinforcing filler.

The silica used in the present invention is not particularly limited. Examples thereof include such as a dry process silica (silicic acid anhydride) and a wet process silica (silicic acid anhydride), and the wet process silica is particularly preferable.

Nitrogen adsorption specific surface area ($N_2SA$) of silica is preferably at least 30 $m^2/g$, and more preferably at least 50 $m^2/g$. When $N_2SA$ is less than 30 $m^2/g$, reinforcement effect due to silica tends not to be obtained. Further, $N_2SA$ of silica is preferably at most 300 $m^2/g$, and more preferably at most 200 $m^2/g$. $N_2SA$ more than 300 $m^2/g$ causes reduction of dispersibility of silica, and thereby processability tends to be remarkably reduced.

The content of silica is preferably at least 5 parts by weight based on 100 parts by weight of the rubber component. When the content is less than 5 parts by weight, only the reduction effect of the rolling resistance due to the compound of BR containing the compound 1 tends to be obtained. The content of the silica is preferably at most 60 parts by weight, and more preferably at most 45 parts by weight. When the content exceeds 60 parts by weight, heating of the tire tends to be increased.

When carbon black is used as the reinforcing filler, the content of carbon black is preferably 10 to 60 parts by weight based on 100 parts by weight of the rubber component. The content of less than 10 parts by weight causes tendency of the insufficient rubber strength, and the content exceeding 60 parts by weight causes tendency of the increased heating of the tire.

The total content of the reinforcing filler is preferably 30 to 80 parts by weight based on 100 parts by weight of the rubber component. The total content of less than 30 parts by weight causes tendency of insufficient tire strength, and the content more than 80 parts by weight causes tendency of the increased heating of the tire.

The volume ratio of the base tread obtained by using the rubber composition of the present invention is preferably at least 10% of the whole tread, and more preferably at least 15%. The volume ratio of less than 10% causes increase in the rolling resistance, and low heat build-up properties tend to become insufficient. Further, the volume ratio is preferably at most 50%, and more preferably at most 40%. The volume ratio exceeding 50% may cause exposure of the base tread on the surface of the tire in wearing.

Further, the volume ratio of a cap tread is preferably at least 50% of the whole tread, and more preferably at least 60%. The volume ratio of less than 50% may cause exposure of the base tread on the surface of the tire in wearing. Further, the volume ratio is preferably at most 90%, and more preferably at most 70%. The volume ratio exceeding 90% causes increase in the rolling resistance, and low heat build-up properties tend to become inadequate.

The tread may have any of the structures of a two-layer structure of the base tread and cap tread, or a multilayer structure of at least three layers. Even when the tread has any of the structures, the volume ratio of the base tread is preferably the same as that of the above.

The tread is prepared by a method for laminating a sheet-shaped non-vulcanized rubber composition obtained after kneading in a predetermined shape, and a method for forming into at least two layers at a head outlet of an extrusion machine by providing a non-vulcanized rubber composition obtained after kneading into at least two extrusion machines.

A pneumatic tire having the base tread containing the rubber composition of the present invention can enhance sufficient low fuel consumption property of the vehicle.

EXAMPLES

The present invention will be explained in detail based on Examples, but the present invention is not limited thereto.

Hereinafter, various chemicals used in Examples will be described.

NR: RSS#3

BR1: Nipol BR1220, manufactured by Nippon Zeon Co., Ltd. (containing no compound 1)

BR2: BR containing the compound 1 (wherein $R^1$=N,N-dimethylamino group, 1.2 units of compound 1 on average are copolymerized with 1,3-butadiene in one molecule of BR2) manufactured by Sumitomo Chemical Co., Ltd.

Carbon Black: Seast NH (HAF class), manufactured by Tokai Carbon Co., Ltd.

Silica: Z1165MP, manufactured by Rhodia (wet process silica, nitrogen adsorption specific surface area: 165 $m^2/g$)

Aromatic Oil: Diana process AH-24, manufactured by Idemitsu Kosan Co., Ltd.

Zinc Flower: Zinc Oxide, manufactured by Mitsui Mining & Smelting Co., Ltd.

Stearic acid: Stearic acid "Tsubaki", manufactured by Nippon Oil & Fats Co., Ltd.

Antioxidant: Antigen 6C (N-(1,3-dimethylbutyl)-N'-phenyl-p-phenylened iamine), manufactured by Sumitomo Chemical Co., Ltd.

Wax: SANNOC N, manufactured by Ouchi Shinko Chemical Industry

Sulfur: Powder sulfur, manufactured by Karuizawa Sulfur Co., Ltd.

Vulcanization Accelerator: NOCCELER CZ (N-cyclohexyl-2-benzothiazyl sulfenamide), manufactured by Ouchi Shinko Chemical Industry Examples 1, 2 and Comparative Examples 1, 2

The various chemicals except sulfur and the vulcanization accelerator were kneaded for 3 minutes by a Banbury mixer according to the compounding content in Table 1. Then, sulfur and the vulcanization accelerator were added, and kneaded by a roll. The obtained mixture was extruded. The extruded sheet-shaped mixture was laminated on a tire molding machine to form the base tread, and thereby a non-vulcanized tire was prepared by laminating with the other tire members. By vulcanizing this tire, test tires (size: 195/65R15) having a tread having two-layer structure of cap tread and base tread were prepared, and presented for each test. In the test tires, the volume ratio of the base tread in the overall tread was 30%.

The test method will be shown below.

(Rolling Resistance Test)

When the test tires were traveled at a rim (15×6 JJ), an internal pressure (230 kPa), a load (3.43 kN) and a speed (80 km/h) by using a rolling resistance testing machine, the rolling resistances were measured, and were expressed by an index when Comparative Example 1 was set to 100. If the index is larger, the rolling resistance is reduced and is excellent.

Table 1 shows the results.

TABLE 1

|  | Examples | | Comparative Examples | |
| --- | --- | --- | --- | --- |
|  | 1 | 2 | 1 | 2 |
| Amount (Part By Weight) | | | | |
| NR | 60 | 60 | 60 | 60 |
| BR1 | — | — | 40 | 40 |
| BR2 | 40 | 40 | — | — |
| Carbon Black | 35 | 25 | 35 | 32 |
| Silica | — | 10 | — | 3 |
| Aromatic Oil | 5 | 5 | 5 | 5 |
| Zinc Flower | 3 | 3 | 3 | 3 |
| Stearic Acid | 2 | 2 | 2 | 2 |
| Antioxidant | 2 | 2 | 2 | 2 |
| Wax | 2 | 2 | 2 | 2 |
| Sulfur | 2 | 2 | 2 | 2 |
| Vulcanization Accelerator | 1.3 | 1.3 | 1.3 | 1.3 |
| Evaluation | | | | |
| Rolling Resistance | 102 | 104 | 100 | 100 |

What is claimed is:

1. A tire having a cap tread and a base tread, wherein the base tread is formed from a rubber composition comprising a rubber component containing 40 to 80% by weight of a butadiene rubber obtained by copolymerizing a compound represented by the formula 1,

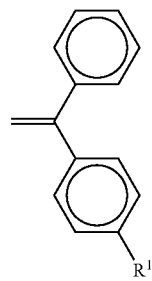

wherein $R^1$ represents an alkoxy group.

2. A tire having a cap tread and a base tread, wherein the base tread is formed from a rubber composition comprising a rubber component containing 40 to 80% by weight of a butadiene rubber obtained by copolymerizing a compound represented by the formula 1,

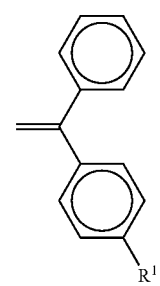

wherein $R^1$ represents a silyloxy group.

3. A tire having a cap tread and a base tread, wherein the base tread is formed from a rubber composition comprising a rubber component containing 40 to 80% by weight of a butadiene rubber obtained by copolymerizing a compound represented by the formula 1,

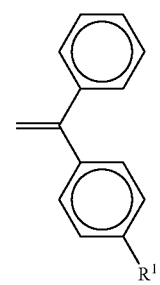

wherein $R^1$ represents an acetal group.

4. A tire having a cap tread and a base tread, wherein the base tread is formed from a rubber composition comprising a rubber component containing 40 to 80% by weight of a butadiene rubber obtained by copolymeriziug a compound represented by the formula 1,

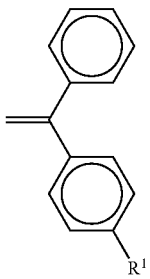

(1)

wherein R¹ represents a carboxyl group.

5. A tire having a cap tread and a base tread, wherein the base tread is formed from a rubber composition comprising a rubber component containing 40 to 80% by weight of a butadiene rubber obtained by copolymerizing a compound represented by the formula 1,

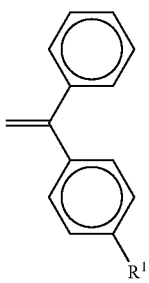

(1)

wherein R¹ represents a mercapto group.

6. A tire having a cap tread and a base tread, wherein the base tread is formed from a rubber composition comprising a rubber component containing 40 to 80% by weight of a butadiene rubber obtained by copolymerizing a compound represented by the formula 1,

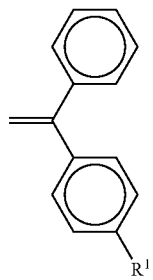

(1)

wherein R¹ represents an amino group.

7. The tire of claim 1, wherein the volume ratio of the base tre obtained by using said rubber composition is 10% to 50% of the whole tread and the volume ratio of the cap tread is 50% to 90% of the whole tread.

8. The tire of claim 2, wherein the volume ratio of the base tread obtained by using said rubber composition is 10% to 50% of the whole tread and the volume ratio of the cap tread is 50% to 90% of the whole tread.

9. The tire of claim 3, wherein the volume ratio of the base tread obtained by using said rubber composition is 10% to 50% of the whole tread and the volume ratio of the cap tread is 50% to 90% of the whole tread.

10. The tire of claim 4, wherein the volume ratio of the base tread obtained by using said rubber composition is 10% to 50% of the whole tread and the volume ratio of the cap tread is 50% to 90% of the whole tread.

11. The tire of claim 5, wherein the vohune ratio of the base tread obtained by using said rubber composition is 10% to 50% of the whole tread and the volume ratio of the cap tread is 50% to 90% of the whole tread.

12. The tire of claim 6, wherein the volume ratio of the base tread obtained by using said rubber composition is 10% to 50% of the whole tread and the volume ratio of the cap tread is 50% to 90% of the whole tread.

\* \* \* \* \*